US005877492A

United States Patent [19]
Fujieda et al.

[11] Patent Number: 5,877,492
[45] Date of Patent: Mar. 2, 1999

[54] CONTACT TYPE IMAGE SENSOR COMPRISING A PLURALITY OF MICROLENSES

[75] Inventors: Ichiro Fujieda; Hiroshi Haga, both of Tokyo, Japan

[73] Assignee: NEC Corporation, Tokyo, Japan

[21] Appl. No.: 713,485

[22] Filed: Sep. 13, 1996

[30] Foreign Application Priority Data

Sep. 14, 1995  [JP]  Japan .................................. 7-236490

[51] Int. Cl.$^6$ ........................... H01J 40/14; H04N 1/028; G02B 6/04
[52] U.S. Cl. ................................. 250/208.1; 250/227.11; 385/120; 358/484
[58] Field of Search ............................. 250/208.1, 208.2, 250/214.1, 227.11, 227.2, 227.26, 227.28; 358/482, 483, 484, 901.1; 257/431, 432, 447, 460; 359/621, 622, 623, 619, 620; 385/33, 34, 35, 49, 74, 901, 116, 120

[56] References Cited

U.S. PATENT DOCUMENTS

| | | | |
|---|---|---|---|
| 4,528,446 | 7/1985 | Dunaway et al. | 250/208.1 |
| 5,046,159 | 9/1991 | Hamanaka | 250/208.1 |
| 5,091,638 | 2/1992 | Yamazaki et al. | 250/208.1 |
| 5,121,254 | 6/1992 | Hamanaka et al. | 359/619 |
| 5,126,859 | 6/1992 | Yoshinouchi et al. | 358/484 |
| 5,149,955 | 9/1992 | Kitamura et al. | 250/208.1 |
| 5,163,117 | 11/1992 | Imanishi et al. | 385/120 |
| 5,256,868 | 10/1993 | Kaplan et al. | 250/208.1 |

FOREIGN PATENT DOCUMENTS

| | | |
|---|---|---|
| 59-164359 | 11/1984 | Japan . |
| 61-171019 | 10/1986 | Japan . |
| 1125170 | 5/1989 | Japan . |
| 3-265356 | 11/1991 | Japan . |
| 6-291935 | 10/1994 | Japan . |
| 6291935 | 10/1994 | Japan . |

OTHER PUBLICATIONS

N. Daemen et al., "Microlenses for Image Sensors", *Phillips Journal of Research*, vol. 48, No. 3, 1994, pp. 281–297 (no month).

M. Oikawa et al., "Flat Plate Micro–Lens Arrays", *Optical Engineer's Department in the Association of Applied Physics Engineers of Japan*, vol. 17, No. 11, 1988, p. 578 (no month).

*Primary Examiner*—Edward P. Westin
*Assistant Examiner*—John R. Lee
*Attorney, Agent, or Firm*—Sughrue, Mion, Zinn, Macpeak & Seas, PLLC

[57] ABSTRACT

A full-contact type image sensor which includes a light source, a plurality of photo-electric conversion elements having apertures, a photoelectric conversion region, a plurality of micro-lenses, and an optical fiber converging member. The light from the light source is allowed to pass solely through the apertures and is blocked by the photoelectric conversion regions. The micro-lenses may be provided in one-to-one correspondence to a plurality of apertures or one-to-one correspondence to a plurality of optical fibers. The micro-lenses may be provided at least at one of a photoelectric conversion element side end and an original document side end of the optical fiber converging member. Instead of using such micro-lenses, the optical fiber converging member may be arranged such that a numerical aperture of the optical fibers at its first region on a side of the photoelectric conversion elements is set to be greater than a numerical aperture of the optical fibers at its second region on a side of the original document. It is possible to provide increased light utilization efficiency.

12 Claims, 11 Drawing Sheets

DISTANCE BETWEEN OPTICAL FIBER CONVERGING MEMBER AND ORIGINAL DOCUMENT (mm)

CONTACT TYPE IMAGE SENSOR COMPRISING A PLURALITY OF MICROLENSES

BACKGROUND OF THE INVENTION (1) Field of the Invention

The present invention relates to a full-contact type image sensor and a method for fabricating the same, and more particularly to a full-contact type image sensor which is mounted on an image input unit, such as a facsimile set or a hand scanner, and which is operable to read an original document in essentially full contact therewith.

(2) Description of the Related Art

Various image sensors for reading image data of an original document have been well known in the art, and full-contact type image sensors which are small in size, are used instead of image sensors using charge coupled devices (CCDs) particularly for hand scanners and facsimile image sensors which are required to be small in size.

Applicant's Corporation has proposed a full-contact type image sensor in which an image sensor with a large number of photoelectric conversion elements formed on a transparent substrate and having apertures is combined with an optical fiber converging member (Japanese Patent Application Kokai Publication No. Hei 6-291935). FIG. 1 shows such an example of the prior art full-contact type image sensor proposed by the Applicant's Corporation. The full-contact type image sensor as shown essentially comprises a light source 1, a number of photoelectric conversion elements 3 provided in an array on a transparent substrate 2, and an optical fiber converging member 8 including a number of optical fibers 9 bundled in an array.

The photoelectric conversion element 3 includes an upper opaque common electrode common to all pixels, lower transparent individual electrodes corresponding to the respective pixels, a photosensitive layer interposed between the upper and lower electrodes, and a number of apertures 5 penetrating a photoelectric conversion region 4 constituted by the electrodes and photosensitive layer.

Next, the operation of the full-contact type image sensor described above will be explained. Light emitted from the light source 1 is transmitted through the transparent insulating substrate 2 and the apertures 5 formed in the photoelectric conversion elements 3 and then through a transparent adhesive layer 7. After passing through the optical fibers 9, the light is incident on an original document 10. The incident light whose incidence angles on the optical fibers 9 are smaller than the aperture angle determined by the numerical aperture (NA) of the optical fibers 9, is repeatedly totally reflected inside the optical fibers 9, thus illuminating the original document 10. Light incident at angles greater than the aperture angle mentioned above, is transmitted through and scattered by the walls of the optical fibers 9, thus causing stray light which deteriorates the image quality.

Of the light reflected from the original document 10 and incident on the optical fibers 9, those components with incidence angles smaller than the aperture angle pass through the optical fibers 9 and are incident on the photoelectric conversion region 4 (photosensitive layer) for photoelectric conversion. With this conventional full-contact type image sensor, since the optical fibers 9 are used for both the illumination of the original document 10 and the transmission of the reflected light therefrom, high resolution image input can be realized.

FIG. 2 is a graph showing the results of calculated resolution for the full-contact type image sensor having the structure as shown in FIG. 1. In the graph, the ordinate is the resolution (Modulation Transfer Function—MTF), and the abscissa is the distance (mm) between the optical fiber converging member 8 and the original document 10. NA is the numerical aperture of the optical fibers 9. As can be seen from FIG. 2, for the same numerical aperture, the resolution deteriorates if the distance between the optical fiber converging member 8 and the original document 10 is increased. That is, the further the optical fiber converging member 8 is separated from the original document 10, the lower the resolution becomes. As can be seen from FIG. 2, this means that the resolution deterioration can be reduced if the optical fiber 9 having a smaller NA is used.

FIG. 3 is a graph with the ordinate representing signal amount of the full-contact type image sensor having the structure as shown in FIG. 1 and the abscissa representing the NA of the optical fiber 9. As is seen from FIG. 3, with large values of NA, the original document 10 can be illuminated with a larger amount of light. In addition, the light reflected from the original document 10 can be led more to the photoelectric conversion region 4 and the signal amount is increased. As is seen from FIGS. 2 and 3, in the full-contact type image sensor having the structure as shown in FIG. 1, the resolution and the signal amount are traded-off with each other.

With an aim of suppressing the resolution deterioration resulting from the separation of the optical fiber converging member from the original document, a full-contact type image sensor has been proposed, which uses a micro-lens array plate provided between an optical fiber converging member and an original document (Japanese Patent Application Kokai Publication No. Hei 3-265356). FIG. 4 is a sectional view showing an example of the prior art contact type image sensor having this structure. As shown, this prior art contact type image sensor comprises a light source 71, a photoelectric conversion element array 72, an optical fiber converging member 73, a micro-lens array plate 75 disposed thereunder, and a light-blocking layer 76 interposed between the optical fiber converging member 73 and the micro-lens array plate 75.

Next, the operation of the conventional full-contact type image sensor described above will be explained. Light emitted from the light source 71 is transmitted obliquely through the optical fiber converging member 73 and the micro-lens array plate 75 to illuminate the original document 77. Light dispersedly reflected from the original document 77 is re-directed by the micro-lens array plate 75 so that the angle with respect to the axial direction of the optical fibers 74 is reduced. Then the light is incident on the optical fiber converging member 73 and thence is incident on the photoelectric conversion element array 72 for photoelectric conversion.

With the prior art full-contact type image sensor as shown in FIG. 4, it is possible to suppress the resolution deterioration as a result of the refracting action of the micro-lens array plate 75 on the reflected light from the original document 77.

With the conventional full-contact type image sensor as shown in FIG. 1, high resolution is obtainable because the optical fibers 9 are used for both the illumination of the original document 10 and the detection of the reflected light from the original document 10. On the demerit side, however, the resolution as determined by the NA of the optical fiber 9 and the signal amount are traded-off with each other as described above before in connection with FIGS. 2 and 3. Therefore, it is very difficult to optimize both the resolution and the signal amount.

Also, it is desired, with the full-contact type image sensor as shown in FIG. 1, to provide a large aperture angle of the optical fibers 9 in order to provide increased light utilization efficiency and suppress stray light. However, with the large aperture angle optical fibers, the light reflected from areas other than those in the original document where the reading-out is not interested, also reaches the photoelectric conversion region 4 after passing through the space 11 between the original document 10 and the optical fiber converging member 8, thus resulting in deterioration of the resolution. No problem arises when the space 11 is not present. This, however, requires the original document 10 to fully contact the optical fiber converging member 8. Particularly, in an application for a hand scanner, the resolution is deteriorated even with a slight separation of the optical fiber converging member 8 from the original document 10, thus making it inconvenient to use.

In the prior art full-contact type image sensor shown in FIG. 4, light emitted from the light source 71 is transmitted obliquely through the optical fiber converging member 73 and the micro-lens array plate 75 to illuminate the original document 77. Therefore, a large amount of stray light is generated as a result of scattering of light by the wall surfaces of the optical fibers 74, and high resolution cannot be obtained.

Besides, the micro-lens array plate 75 has a thickness of the order of several tens of microns for it is fabricated by such processes as mechanical processing or die molding a plastic material, glass or other such transparent materials. This means that close contact is sacrificed by a distance corresponding to the thickness of the microlens array plate 75. In other words, with the prior art full-contact type image sensor shown in FIG. 4, the close contact of the micro-lens array plate 75 with the original document 77 is equivalent to the separation of the optical fiber converging member 73 from the original document 77 in the order of several ten microns, and this means deterioration of the resolution to a corresponding extent.

In another aspect, for efficient transmission of light reflected from the original document 77, it is desirable that the micro-lenses in the micro-lens array plate 75 and the optical fibers 74 in the optical fiber converging member 73 are in one-to-one correspondence with one another. However, their mutual one to one positioning is quite difficult, and is impossible particularly in the case where the optical fibers 74 of the optical fiber converging member 73 are subject to deformation during manufacture.

SUMMARY OF THE INVENTION

An object of the invention, therefore, is to overcome the problems existing in the prior art, and to provide an improved full-contact type image sensor and a method for fabricating the same, with which the trade-off relation between the resolution and the signal amount is reduced.

Another object of the invention is to provide a full-contact type image sensor, which can provide a high light utilization efficiency and is subject to less influence by the separation of the optical fiber converging member from the original document, and a method for fabricating the same.

A further object of the invention is to provide a full-contact type image sensor which can be fabricated with ease, and a method for fabricating the same.

According to a first aspect of the invention, there is provided a full-contact type image sensor comprising:

a light source for emitting light;

a plurality of photoelectric conversion elements provided in a linear or two-dimensional array on a transparent insulating substrate and each having one or more apertures and a photoelectric conversion region, the light from the light source being allowed to pass solely through the apertures and blocked by the photoelectric conversion region;

a plurality of lens means provided correspondingly to the apertures of the photoelectric conversion elements; and an optical fiber converging member including a bundle of a plurality of optical fibers in close contact via a transparent adhesive layer with the photoelectric conversion elements, the optical fiber converging member being for guiding light having been transmitted through the apertures and the plurality of lens means to illuminate an original document and guiding light reflected from the original document through the adhesive layer to the photoelectric conversion region of the photoelectric conversion elements.

In the full-contact type image sensor, the lens means may be a plurality of micro-lenses provided in close contact respectively with the apertures of the photoelectric conversion elements.

The lens means may be in the form of a plurality of micro-lenses provided at least at one of a photoelectric conversion element side end and the original document side end of the optical fiber converging member in one-to-one correspondence to the plurality of optical fibers.

According to a second aspect of the invention, there is provided a full-contact type image sensor in which the lens means is constituted by a first region and a second region of the optical fiber converging member arranged such that a numerical aperture of the plurality of optical fibers at the first region on a side of the photoelectric conversion elements is set to be greater than a numerical aperture of the plurality of optical fibers at the second region on a side of the original document.

In fabricating the fully contact type image sensor according to one aspect of the invention, there is provided a method which comprises:

a first step of providing a number of photoelectric conversion elements respectively having apertures and photoelectric conversion region in an array on a transparent insulating substrate;

a second step of coating a micro-lens material containing a photo-sensitive material on the photoelectric conversion elements on the transparent insulating substrate;

a third step of photolithographically exposing, after the second step, the transparent insulating substrate on a side thereof having no coated micro-lens material, followed by development, such that portions of the micro-lens material corresponding only to the exposed apertures are left in place; and a fourth step of heat treating the resulting structure after the third step to form curved surfaces of the portions of the micro-lens material.

Now, the function of the invention will be explained. In the contact type image sensor according to the first aspect of the invention, micro-lenses which are provided in one-to-one correspondence to photoelectric conversion element apertures, or optical fiber converging member ends, refracts incident light so as to reduce the angle thereof to the axial direction of the optical fiber. Thus, some components of light emitted from the light source, specifically some components of light incident on the micro-lenses at angles exceeding the optical fiber aperture angle, pass through the optical fibers. It is thus possible to obtain increased light utilization efficiency compared to the prior art.

In addition, in the event of separation of the optical fiber converging member from the original document, light reflected from the original document is incident on an optical fiber which is found immediately above the point of its incidence at an incidence angle with respect to a separate optical fiber. This has an effect of alleviating the resolution deterioration due to separation of the optical fiber converging member from the original document.

In the contact type image sensor according to the second aspect of the invention, a large amount of light from the light source is taken up by the optical fibers because a smaller numerical aperture of the optical fiber converging member on the photoelectric conversion element side. Of the light reflected from the original document, only light from incidence points in the neighborhood of the point immediately underneath an optical fiber can be taken up by that optical fiber.

In the method of fabrication according to the invention, micro-lenses can be fabricated accurately in a micro-lens fabrication process, which involves a self-aligning exposure step making use of areas not transmitting any light, i.e., areas other than apertures or areas not transmitting light from the optical fiber converging member.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the invention are explained with reference to the drawings.

Figure 5:
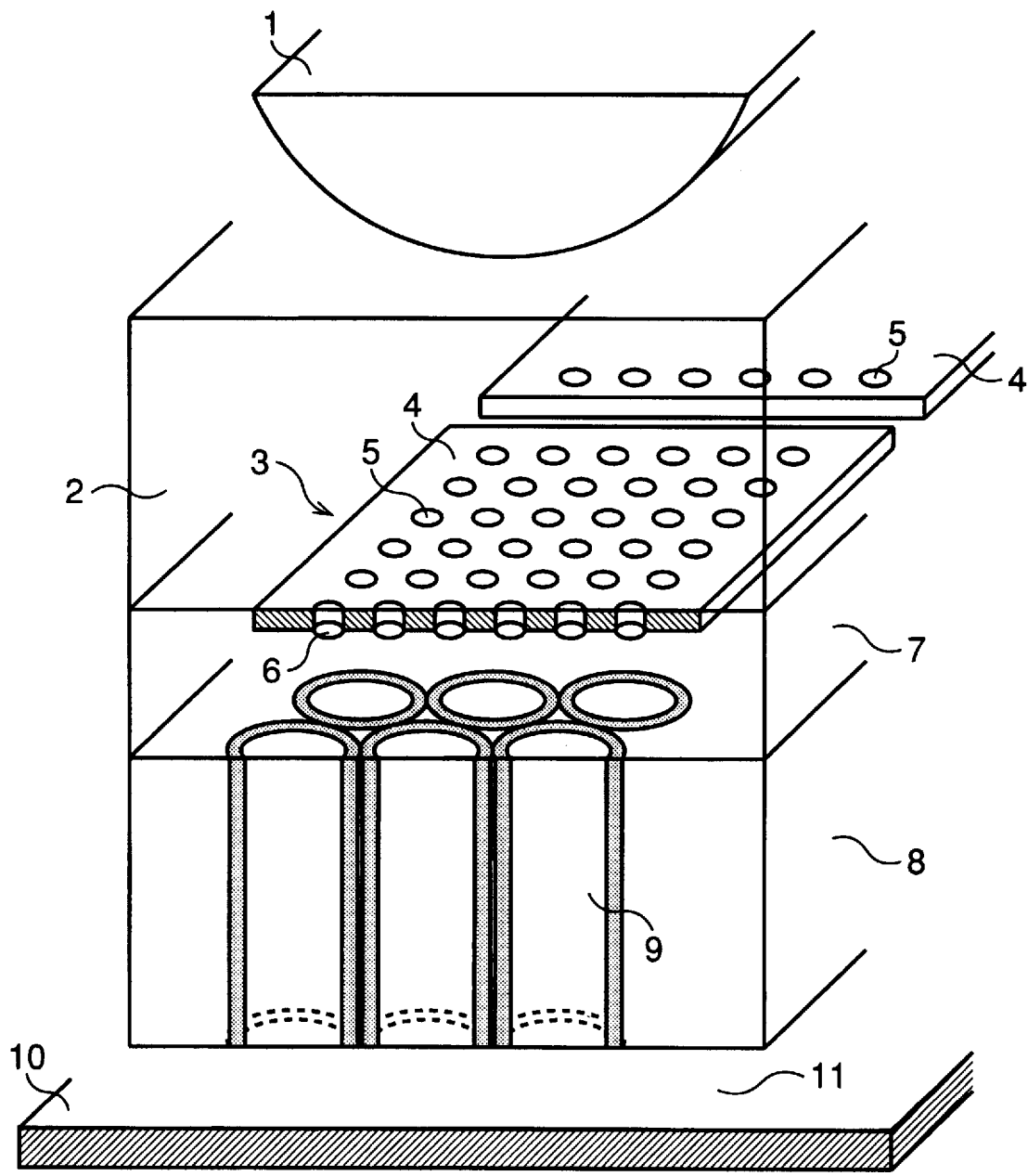
FIG. 5 is a diagram of a full-contact type image sensor of a first embodiment according to the invention.

FIG. 5 schematically shows a full-contact type image sensor of the first embodiment of the invention. As shown therein, this embodiment of an image sensor essentially comprises a light source 1, a number of photoelectric conversion elements 3 provided in a linear or two-dimensional array on a transparent insulating substrate 2 disposed near the light source 1 and each having one or more apertures 5, and an optical fiber converging member 8 held in contact via an adhesive layer 7 with the photoelectric conversion elements 3. The adhesive layer 7 is one which is transparent and used to bond usual optical parts. It is possible to use UV hardening resins as well.

Figure 1:
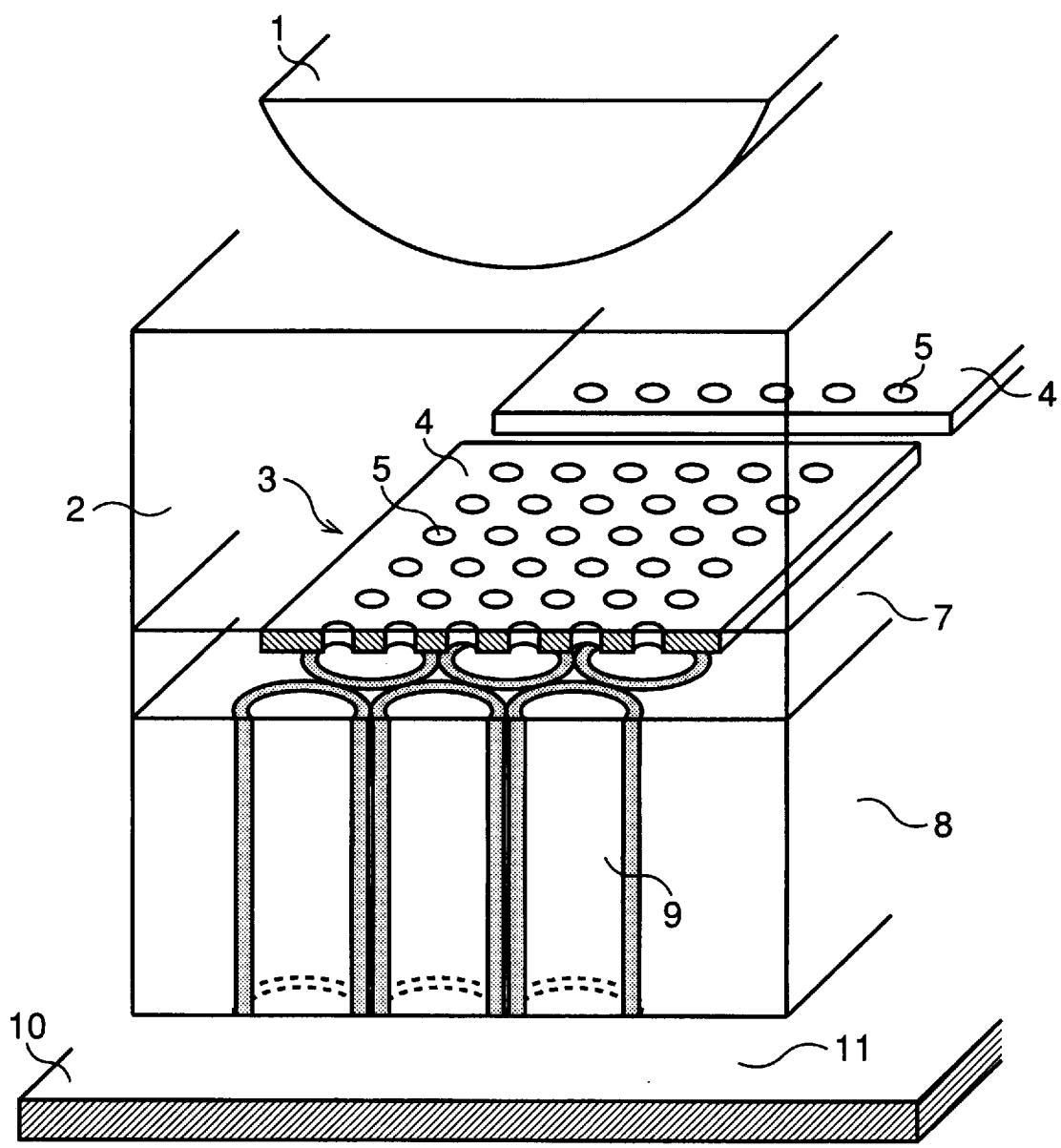
FIG. 1 is a perspective view, partially in section, of an example of a prior art full-contact type image sensor previously proposed by the Applicant's Corporation.
Figure 2:
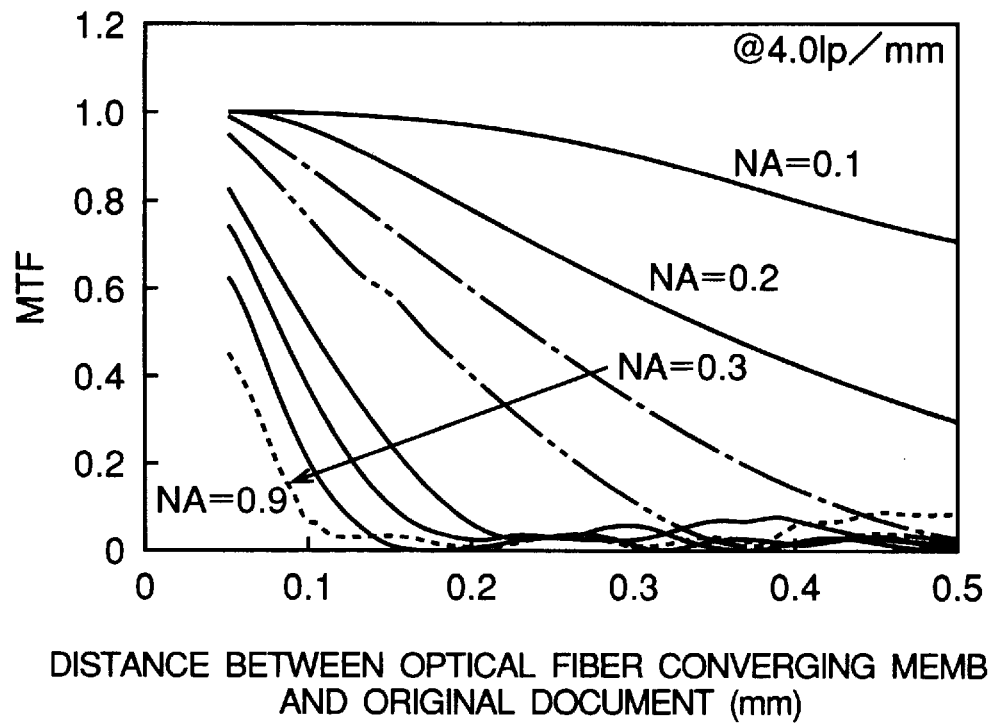
FIG. 2 is a graph for use in explaining resolution in the full-contact type image sensor shown in FIG. 1.
Figure 3:
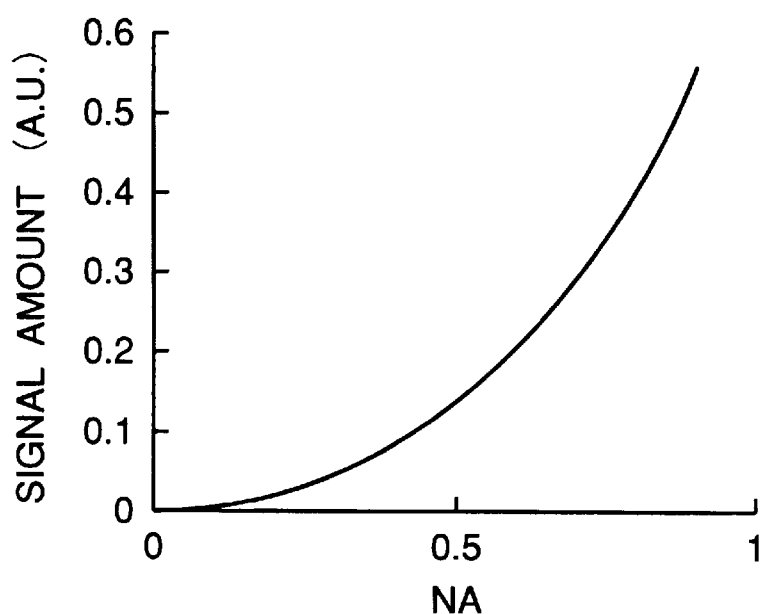
FIG. 3 is a graph for use in explaining signal amount in the full-contact type image sensor shown in FIG. 1.

The photoelectric conversion element 3 is the same as in the full-contact type image sensor shown in FIG. 1 proposed earlier by the applicant insofar as it includes an opaque common electrode on the side of the light source 1 and common to all pixels, a transparent individual electrode on the side of the optical fiber converging member and corresponding to the individual pixels, a photoelectric conversion region 4 constituted by a photo-sensitive layer between the common and individual electrodes, and one or more apertures 5 penetrating the electrodes and photosensitive layer. In this embodiment, it is featured that micro-lenses 6 are provided in one-to-one correspondence to the apertures 5.

Figure 6:
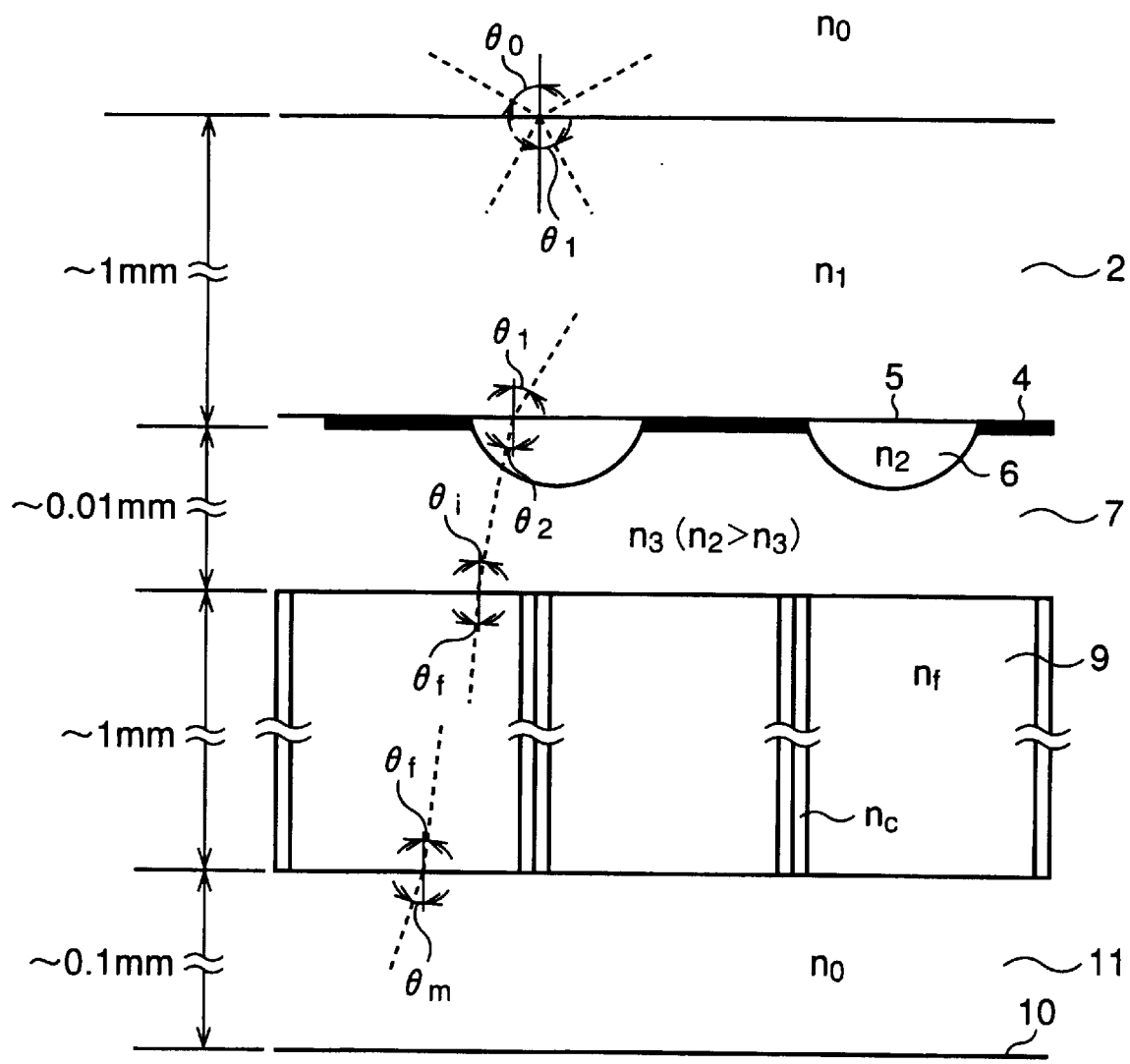
FIG. 6 is a diagrammatic sectional view for use in explaining positional relationship of constituent elements of the image sensor shown in FIG. 5.

FIG. 6 is a sectional view showing the positional relationship of constituent elements of the first embodiment. In FIG. 6, parts like those in FIG. 5 are designated by like reference numerals. As shown, the transparent insulating substrate 2 is a glass layer having a thickness of about 1 mm and a refractive index of $n_1$. On the transparent insulating substrate 2, the photoelectric conversion region 4 is formed with a thin film semiconductor material, for instance, amorphous silicon. As for the size of the photoelectric conversion region 4, in correspondence to the required resolution of the image sensor, one side is set to several tens to a hundred microns, and the thickness is set to be about 1 micron or below. Each photoelectric conversion region 4 has one or more apertures 5. Micro-lenses 6 are formed in one-to-one correspondence to the apertures 5.

The size of the apertures 5 and micro-lenses 6 is set to several to several ten microns. The optical fiber converging member 8 has a thickness of about 1 mm, and it is formed by collecting and solidifying a number of the optical fibers 9. The optical fibers 9 have a fiber diameter of about 15 to 25 microns. Their clad and core portions have refractive indexes of $n_c$ and $n_f$, respectively.

For the transmission of light through the optical fiber 9, the incidence angle should be no greater than one that is determined by the NA of the optical fiber 9. The NA is determined by the refractive indexes of the core and the clad of the optical fiber 9, and approximately ranges from 0.1 to 0.9. The optical fiber converging member used in this embodiment has comparatively small NA. The optical fibers 9 (i.e., optical fiber converging member 8) and the transparent insulating substrate 2 with refractive index $n_1$ are bonded to each other via the adhesive layer 7 having a thickness of about 0.01 mm. The refractive index $n_3$ of the adhesive layer 7 is set to be smaller than the reflective index $n_2$ of the micro-lenses 6.

The optical fibers 9 (i.e., optical fiber converting member 8) should be disposed so as to be in close contact with the original document 10. However, a clearance or space 11 may possibly be generated when the image sensor is mounted on a hand scanner due to such causes as separation of the scanner from the original document during manual scanning or separation of the optical fiber converging member 8 from the original document 10 when foreign particles are attached to the original document 10. In FIG. 6, shown as no is the refractive index of air.

The operation of this embodiment will now be described with reference to FIGS. 5 and 6. The light emitted from the light source 1 is transmitted through the transparent insulating substrate 2, and then passes solely through the apertures 5 of the photoelectric conversion elements 3 and reaches the micro-lenses 6 while being blocked by the areas of the photoelectric conversion elements 3 other than the apertures 5.

The micro-lenses 6 refract the incident light so as to reduce the angle thereof with respect to the axial direction of the optical fibers 9. More specifically, the micro-lenses 6 refract light from the light source 1, incident at an incidence angle $\theta_1$, with a refraction angle $\theta_2$ smaller than the incidence angle $\theta_1$ as shown in FIG. 6. Thus, some light emitted from the light source 1, specifically some light incident on the micro-lenses 6 at incidence angles greater than the aperture angle of the optical fibers 9, is passed through optical fibers 9. Increased light utilization efficiency thus can be provided compared to the prior art structure.

Light refracted by the micro-lenses 6 is passed through the adhesive layer 7 to be incident on the optical fibers 9 at incidence angle $\theta_i$ and refracted at refraction angle $\theta_f$ to be passed through the optical fibers 9. From the optical fibers 9, light is emitted at emission angle $\theta_m$ to be incident on and to illuminate the original document 10. Of the resultant light reflected from the original document 10, only those components which are incident on the optical fibers 9 at angles smaller than the aperture angle of the optical fiber 9 (i.e., angles smaller than the maximum incidence angle $\theta_m$) are transferred through the optical fibers 9 and reach the photoelectric conversion region 4 for photoelectric conversion therein. In this embodiment, the illumination of the original document 10 and the transfer of light reflected from the original document are done through the same optical fibers 9. High resolution image input thus is realized.

In the event of separation of the optical fiber converging member 8 from the original document 10, i.e., generation of a space 11 between the two, light reflected from the original document 10 and incident a different optical fiber, is not transferred through the different optical fiber because the incidence angle is too large. This has an effect of alleviating the resolution deterioration caused by the separation of the optical fiber converging member 8 from the original document 10. Thus, according to this embodiment it is possible to reduce the prior art trade-off between the NA and the signal amount. This embodiment thus realizes a full-contact type image sensor, which provides a high light utilization efficiency and is less influenced by the separation of the optical fiber converging member from the original document.

Figure 7A:
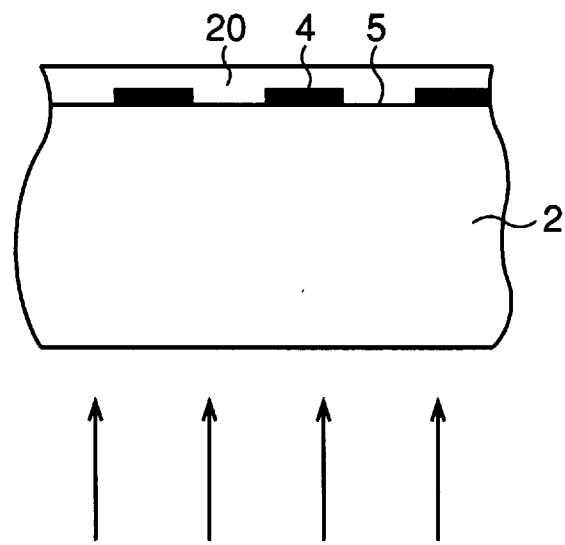
FIGS. 7A–7C are diagrams partly in sectional views for showing steps in an example of the micro-lens fabrication process according to the invention.
Figure 7B:
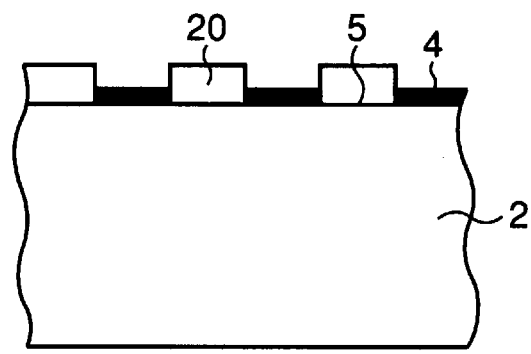
Figure 7C:
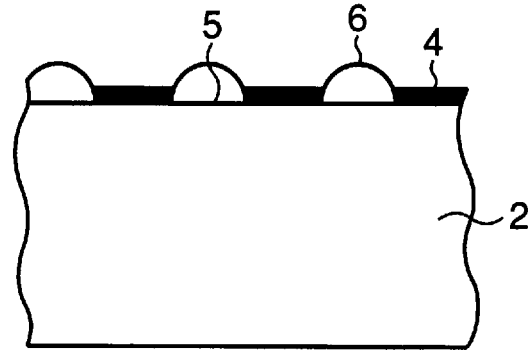

The micro-lens fabrication process will now be described. FIGS. 7A to 7C are sectional views showing steps in an example of the micro-lens fabrication process. It is well known in the art that micro-lenses can be fabricated by a series of steps including lens material film formation, photolithography and heat treatment (Philips Journal of Research, Vol. 48, No. 3, pp. 281–297, 1994). The micro-lenses used according to the invention are fabricated in a similar process. In the photolithography step, however, exposure is made from the side of the transparent substrate with the photoelectric conversion region 4 used as masks. That is, self-aligning type photolithography not requiring any separate mask is realized.

As shown in FIG. 7A, first an array of a number of photoelectric conversion elements, which are formed on the transparent insulating substrate 2 having the apertures 5 and the photoelectric conversion region 4, is coated with a micro-lens material 20 containing a photo-sensitive material by means of spin coating. Then, the surface of the transparent insulating substrate 2 not coated with the micro-lens material 20 is photolithographically exposed.

Subsequently, the elements mentioned above are developed. As a result, portions of the micro-lens material 20 corresponding to the exposed areas, i.e., apertures 5, are left in place, while those corresponding to the non-exposed areas, i.e., the photoelectric conversion region 4, are removed, as shown in FIG. 7B.

The remaining micro-lens material 20 is then softened by a heat treatment to form curved surfaces of it, as shown in FIG. 7C. Finally, a planarization film is formed on the curved surfaces, thus obtaining the micro-lenses 6. These micro-lenses 6 may be either convex or concave lenses depending on the magnitude relation between the refractive indexes of the planarization film and the micro-lens material 20. In the first embodiment shown in FIGS. 5 and 6, the adhesive layer also serves as the planarization film. In this structure, the micro-lenses 6 have to be convex lenses, so that the refractive index $n_2$ of the micro-lenses 6 is set to be greater than the refractive index $n_3$ of the adhesive layer 7.

While in the above example the micro-lens material 20 used contained a photo-sensitive material, it is alternatively possible to coat with a micro-lens material free from any photo-sensitive materials, and then separately coat with a photo-sensitive material before the exposure and development in the manners as described above.

Figure 4:
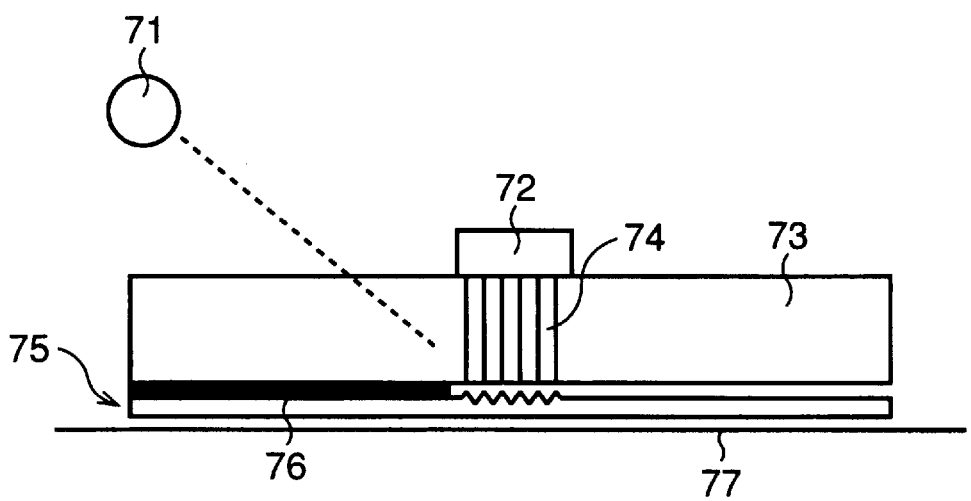
FIG. 4 is a sectional view of another example of a prior art full-contact type image sensor.

As shown, in this embodiment it is possible to easily produce the micro-lenses 6 solely in the apertures 5 of the photoelectric conversion elements 3. That is, unlike the prior art full-contact type image sensor shown in FIG. 4, the positioning of the micro-lenses on the micro-lens array plate 75 and the optical fibers 74 of the optical fiber converging member 73 in one-to-one correspondence is unnecessary, so that it is possible to readily fabricate the micro-lenses.

Figure 8:
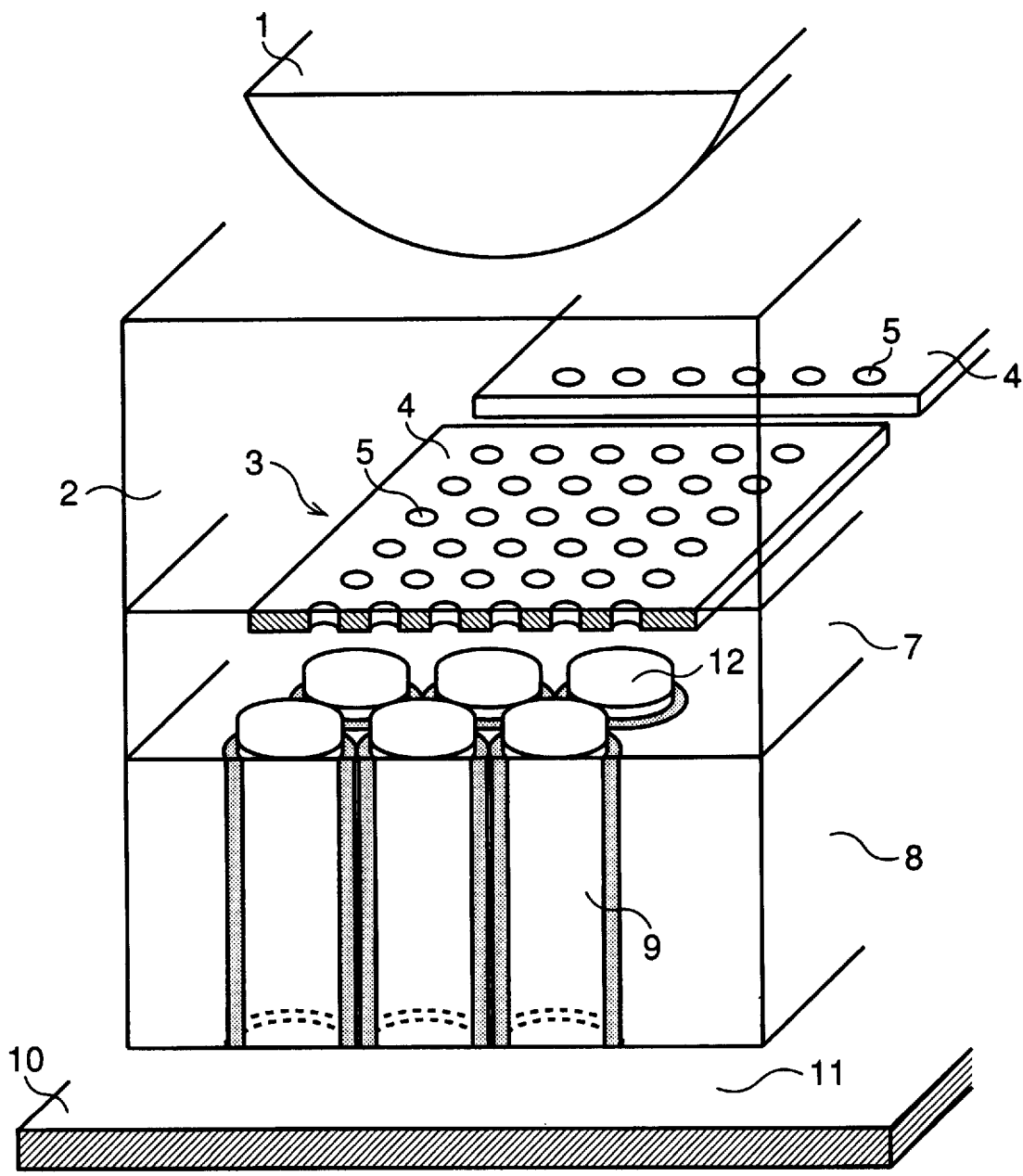
FIG. 8 is a diagram of a full-contact type image sensor of a second embodiment according to the invention.
Figure 9:
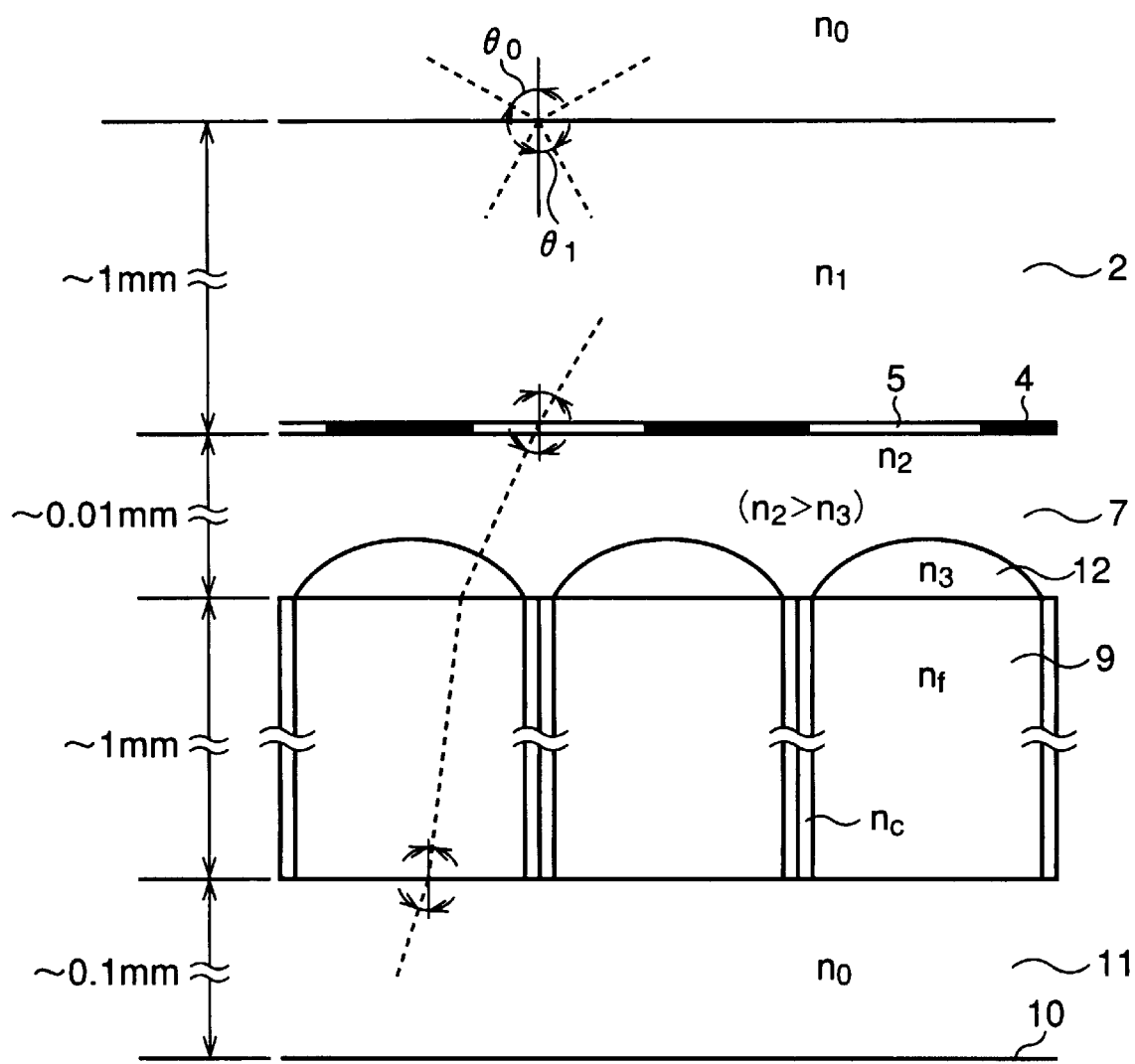
FIG. 9 is a diagrammatic sectional view for use in explaining positional relationship of constituent elements of the image sensor shown in FIG. 8.

A second embodiment of the invention will now be described. FIG. 8 is a schematic view showing a full-contact type image sensor according to the second embodiment of the invention. FIG. 9 is a sectional view showing positional relationship of various constituent elements shown in FIG. 8. Parts like those in FIGS. 5 and 6 are designated by like reference numerals, while omitting their descriptions.

As shown in FIGS. 8 and 9, this embodiment features that micro-lenses 12 are provided in lieu of the micro-lenses 6 in the first embodiment shown in FIG. 5 and in one-to-one correspondence to the ends of a plurality of optical fibers 9 corresponding to respective photoelectric conversion elements 3.

The operation of this embodiment will now be described with reference to FIGS. 8 and 9. Light emitted from the light source 1 is transmitted through the transparent insulating substrate 2, and then passed solely through the apertures 5 of the photoelectric conversion elements 3 while being blocked by the areas thereof other than the apertures 5. Light having passed through the apertures 5 is transmitted through the adhesive layer 7 and reaches the micro-lenses 12.

The micro-lenses 12 refract the incident light so as to reduce the angle thereof with respect to the axial direction of the optical fibers 9. Thus, some of the light emitted from the light source 1, specifically some of the light incident on the micro-lenses 12 at incidence angles greater than the aperture angle of the optical fibers 9, is transferred through the optical fibers 9 due to the refracting action of the micro-lenses 12. Increased light utilization efficiency is thus obtained compared to the prior art structure.

Light refracted by the micro-lenses 12 passes through the optical fibers 9 and illuminates the original document 10. Of the resultant light reflected from the original document 10, only those components which are incident on the optical fibers 9 at angles smaller than the aperture angle of the optical fiber 9 are transferred through the optical fibers 9 and reach the photoelectric conversion region 4 for photoelectric conversion therein. Again in this second embodiment, like the previous first embodiment, the illumination of the original document 10 and the transfer of light reflected from the original document 10 are done through the same optical fibers 9, thus enabling high resolution image input to be realized.

The micro-lenses 12 can be formed in the manner as described before in connection with FIGS. 7A to 7C. Specifically, a micro-lens material containing a photo-sensitive material is coated by means of spin coating on the optical fiber converging member 8. Then the substrate surface on the side opposite the optical fiber converging member 8 is exposed with the areas other than the optical fibers 9 used as a mask, and then developed to leave microlens material portions in one-to-one correspondence to the optical fibers 9. Then, these micro-lens material portions are softened by a heat treatment to form curved surfaces of them. The adhesive layer 7 is finally formed, and it serves as a planarization film as well. In this embodiment, the micro-lenses 12 should be concave lenses, and thus the refractive index $n_3$ of the micro-lenses 12 is set to be smaller than the refractive index $n_2$ of the adhesive layer 7.

Figure 10:
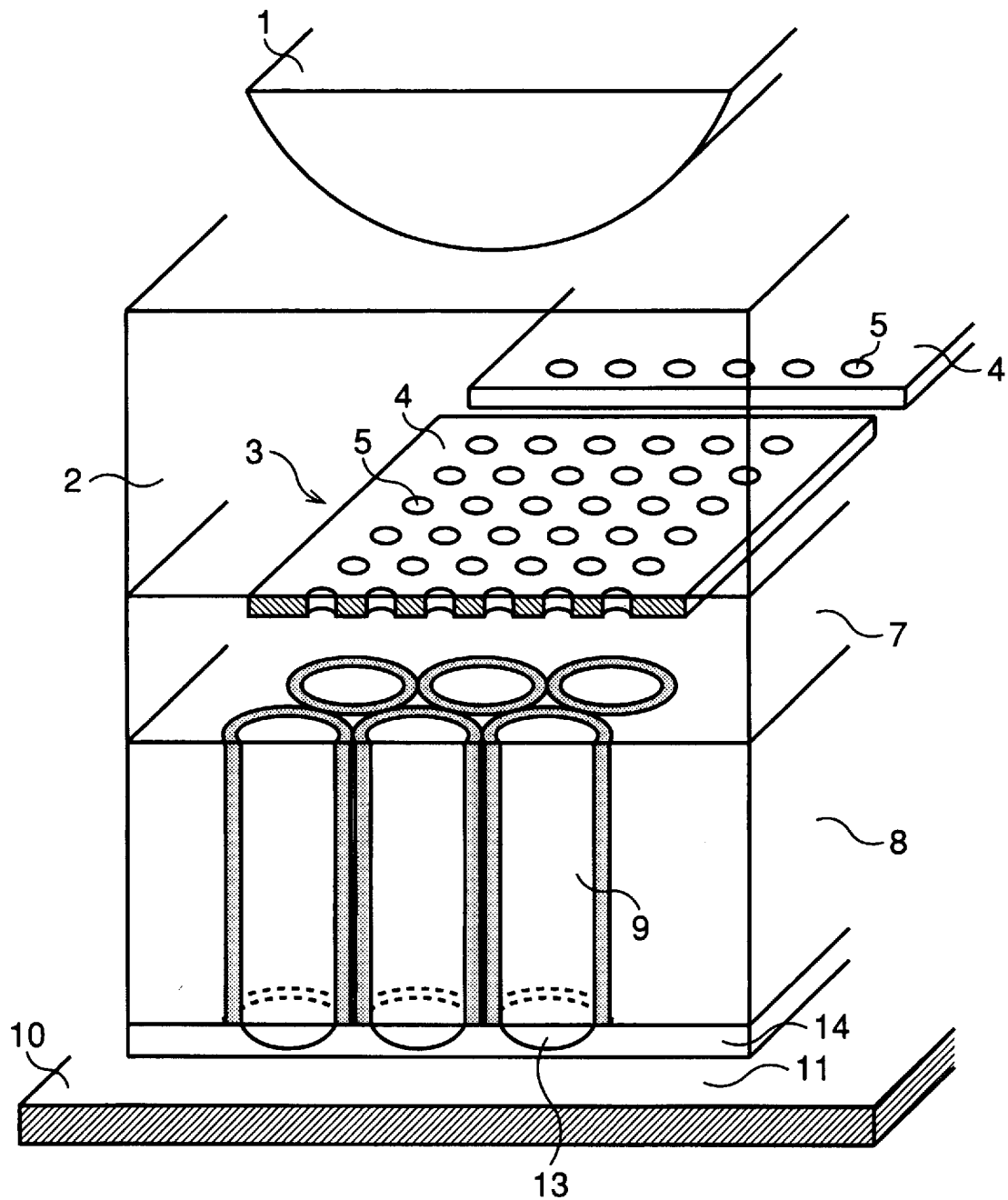
FIG. 10 is a diagram of a full-contact type image sensor of a third embodiment according to the invention.
Figure 11:
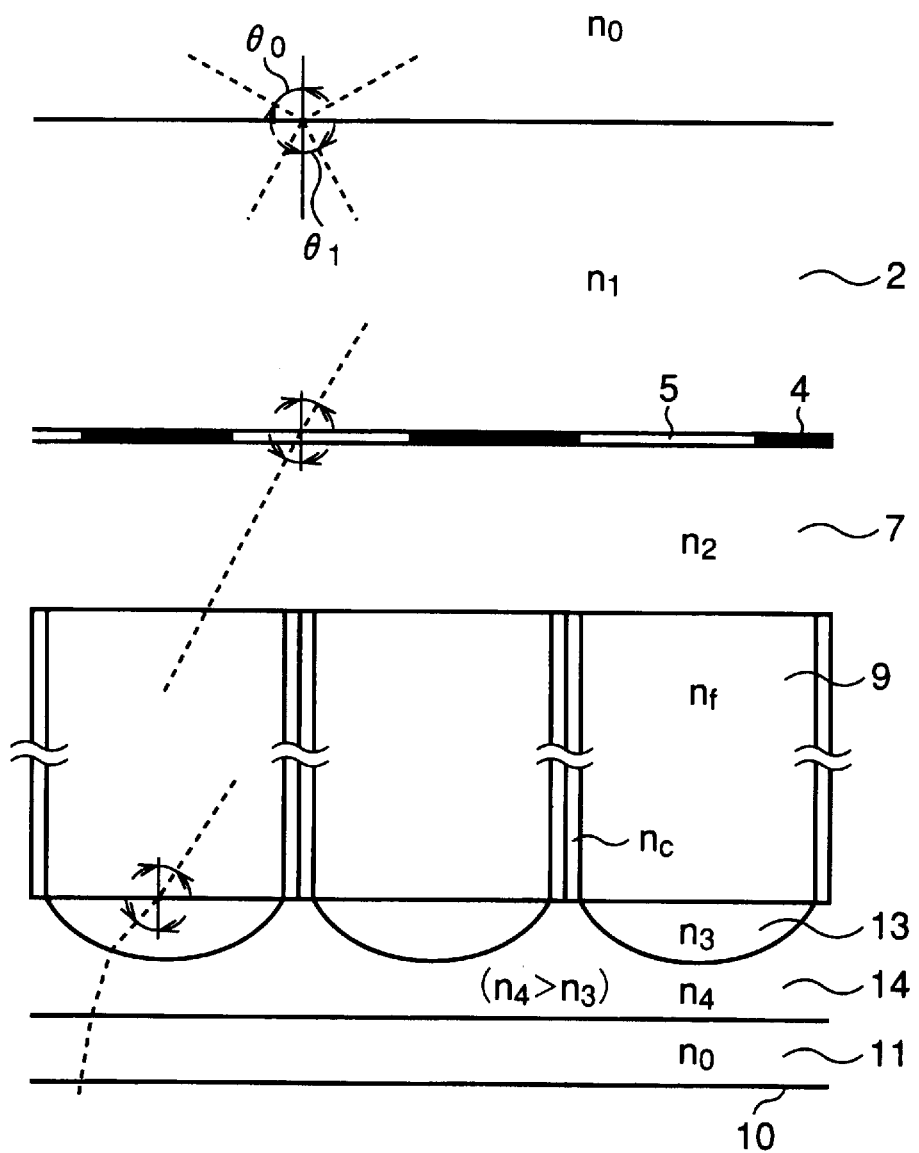
FIG. 11 is a diagrammatic sectional view for use in explaining positional relationship of constituent elements of the image sensor shown in FIG. 10.

A third embodiment of the invention will now be described. FIG. 10 is a schematic view showing a full-contact type image sensor according to the third embodiment of the invention. FIG. 11 is a sectional view showing the positional relation of various elements shown in FIG. 10. Parts like those in FIGS. 5 and 6 are designated by like reference numerals, and their description is omitted.

As shown in FIGS. 10 and 11, this embodiment features the provision, in place of the micro-lenses 6 or 12 mentioned above, micro-lenses 13 in one-to-one correspondence to ends of a plurality of optical fibers 9 corresponding to the original document 10 and also the provision of a transparent protective film 14 for protecting the micro-lenses 13.

The operation of this embodiment will now be described with reference to FIGS. 10 and 11. Light emitted from the light source 1 is transmitted through the transparent insulating substrate 2, and then passed solely through the apertures 5 of the photoelectric conversion elements 3 while being blocked by the areas thereof other than the apertures 5. Light having passed through the apertures 5 is transmitted through the adhesive layer 7 and the optical fiber converging member 8 and reaches the micro-lenses 13 where it is refracted, and is transmitted through the protective film 14, thus being incident on and illuminating the original document 10.

The resultant light reflected from the original document 10 is transmitted through the protective film 14 to be incident on the micro-lenses 13 for refraction thereby so as to reduce its angle with respect to the axial direction of the optical fibers 9. The refracted light is transferred through the optical fibers 9 and reaches the photoelectric conversion region 4 for photoelectric conversion. Thus, some of the light reflected from the original document 10, specifically some of light incident on the micro-lenses 13 at angles greater than the aperture angle of the optical fiber 9, is transferred through the optical fibers 9. Increased light utilization efficiency is thus provided as compared to the prior art structure, thus permitting high resolution image input to be realized.

The micro-lenses 13 may be fabricated in the same way as the fabrication of the micro-lenses 12 in the second embodiment. Specifically, a micro-lens material containing a photo-sensitive material is coated by means of spin coating on the optical fiber converging member 8. The transparent insulating substrate 2 is then photolithographically exposed from the opposite side of the optical fiber converging member 8 with the areas other than the optical fibers 9 being used as masks, followed by development, whereby micro-lens material portions are left in place in one-to-one correspondence to the optical fibers 9. The micro-lens material portions are then softened by a heat treatment to form curved surfaces thereon. Finally, a protective film 14 is formed. In this embodiment, the micro-lenses 13 should be concave lenses, and thus the refractive index $n_3$ of the micro-lenses 13 is set to be smaller than the refractive index $n_4$ of the protective film 14.

Figure 12:
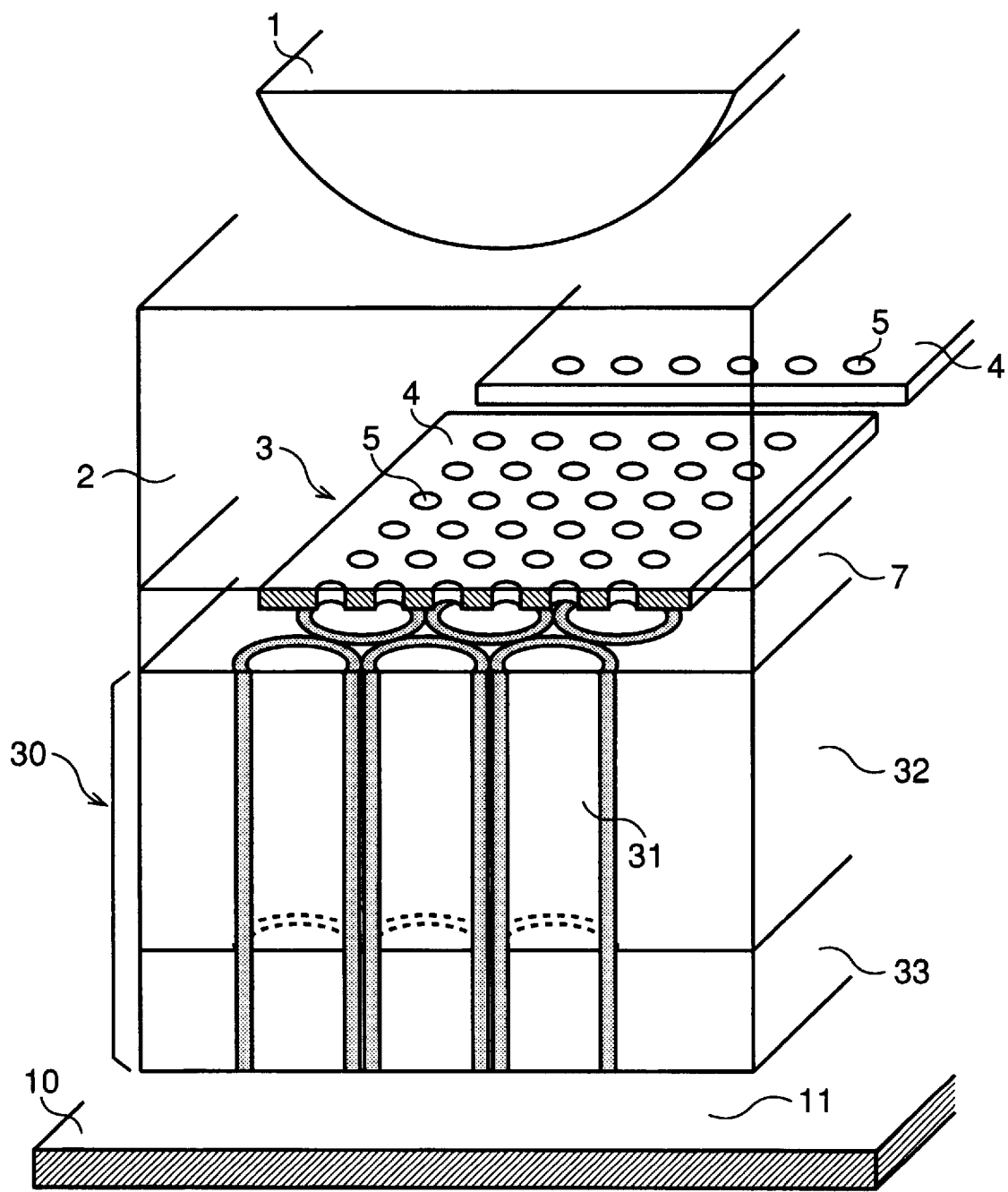
FIG. 12 is a diagram of a full-contact type image sensor of a fourth embodiment according to the invention.

A fourth embodiment of the invention will now be described. FIG. 12 is a schematic view showing a full-contact type image sensor according to the fourth embodiment of the invention. In FIG. 12, parts like those in FIGS. 5 and 6 are designated by like reference numerals, and their description is omitted.

As shown in FIG. 12, the elements of the embodiment include a light source 1, a number of photoelectric conversion elements 3 provided in a linear or two-dimensional array on a transparent insulating substrate 2 disposed in the vicinity of the light source and each having one or more apertures 5, and an optical fiber converging member 30 in close contact therewith via an adhesive layer 7. The optical fiber converging member 30 has a structure obtained by bundling a number of the optical fibers 31, and it includes a large NA optical fiber region 32 provided on the side of the adhesive layer 7 and a small NA optical fiber region 33 provided on the side of the original document 10.

The NA of the optical fiber 31 is represented by the root of the difference between the square of the refractive index $n_f$ of the core and the square of the refractive index $n_c$ of the clad in the optical fiber 31. This means that the two optical fiber regions 32 and 33 are different in the values of the set of the refractive indexes $n_f$ and $n_c$. It is not necessary for the boundary between the two optical fiber regions 32 and 33 to be clearly definite, and the refractive index may have gradients in their values.

The optical fiber converging member 30 may be fabricated so as to have such an NA distribution by, for instance, an ion exchange process used for micro-lens fabrication (M. Oikawa et al., "Flat Plate Micro-Lens Arrays", Vol. 17, No. 11, p. 578, issued by the Optical Engineer's Department in the Association of Applied Physics Engineers of Japan, 1988). Specifically an eventual optical fiber converging member is formed by using fiber glass with a predetermined ion concentration, and is then brought into contact with a high temperature fused salt. As a result, ions in glass at one end of the eventual optical fiber converging member and ions in the fused salt are ion-exchanged, whereby the optical fiber regions 32 and 33 having different refractive indexes are formed as opposite end portions of the optical fiber converging member.

The operation of this embodiment will now be described with reference to FIG. 12. Light emitted from the light source 1 is transmitted through the transparent insulating substrate, and then passes solely through the apertures 5 in the photoelectric conversion elements 3 while being blocked by the areas thereof other than the apertures 5. Light having passed through the apertures 5 is transmitted through the adhesive layer 7 to be incident on the large NA optical fiber region 32 of the optical fiber converging member 30. On the side of the light source 1, the aperture angle is large because of large NA, and a large amount of light thus can be taken up by the optical fibers 31.

Light having passed through the optical fibers 31 in the optical fiber region 32 and reaching the small NA optical fiber region 33, partly proceeds through the optical fibers 31 and, while being continuously totally reflected, is incident on and illuminates the original document 10. The rest of light leaks to the outside of the optical fibers 31. The leaking light, however, is utilized for illuminating the original document 10.

Of the light reflected from the original document 10, those components which are incident on the optical fiber region 33 at incidence angles smaller than an aperture angle of the optical fiber region 33 determined by the NA thereof, proceed through the optical fibers 31 in the optical fiber region 33 while being totally reflected successively. The light partly leaks to the outside of the optical fibers 31. The leaking light, however, reaches the photoelectric conversion regions 4 in a very small ratio when the optical fiber region 32 is designed to have a large thickness. The remaining part of the light is successively totally reflected in the optical fibers 31 of the optical fiber region 32, and is photoelectrically converted in the photoelectric conversion regions 4.

As shown, in this embodiment, on the side of the light source 1, the NA is large so that light utilization efficiency is high. On the side of the original document 10, on the other hand, the NA is small, thus suppressing the resolution deterioration caused by a separation of the optical fiber converging member 30 from the original document 10.

The method for fabricating the optical fiber converging member 30 with the optical fiber regions 32 and 33 having different NA values, is by no means limited to the ion exchange process, which was described before in connection with FIG. 12. For example, it is possible to form an optical fiber converging member by stacking two or more optical fiber converging members having different NA values.

While it was described in connection with the above embodiments that the photoelectric conversion element 3 has an opaque common electrode on the light source side and transparent individual electrodes on the original document side, this is by no means limited to this configuration. It is possible for opaque individual electrodes to be on the light source side while a transparent common electrode is on the original document side. The apertures may not be circular in plan shape. It is possible to combine the embodiments shown in FIGS. 8 and 10 such that micro-lenses are disposed at the both ends of an optical fiber converging member.

As has been described in the foregoing, according to the invention, it is possible to alleviate the tolerance of the trade-off between the NA and the signal amount, provide increased light utilization efficiency, and alleviate the resolution deterioration caused by the separation of the optical fiber converging member from the original document. Moreover, it is possible to let a large amount of light from the light source be taken in by the optical fibers and, as to the light reflected from the original document, let only light from a reflection point in the vicinity of the point immediately underneath the pertinent optical fiber be taken in by the optical fibers. A full-contact type image sensor is thus realized, which has high light utilization efficiency and is less influenced by the separation of the optical fiber converging member from the original document.

The method of fabrication according to the invention permits accurate fabrication of micro-lenses by a self-aligned exposure step and at desired positions. Thus, unlike the prior art, it is possible to readily fabricate micro-lenses without need of positioning the microlenses.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A full-contact type image sensor comprising:
   a light source for emitting light;
   a plurality of photoelectric conversion elements provided in a linear or two-dimensional array on a transparent insulating substrate and each having one or more apertures and a photoelectric conversion region, said light from said light source being allowed to pass solely through said apertures and blocked by the photoelectric conversion regions;
   a plurality of micro-lenses provided in close contact and in one-to-one correspondence with said apertures of said photoelectric conversion elements; and
   an optical fiber converging member including a bundle of a plurality of optical fibers in close contact via a transparent adhesive layer with the photoelectric conversion elements, said optical fiber converging member for guiding light having been transmitted through said apertures and said plurality of micro-lenses to illuminate an original document and for guiding light reflected from said original document through said adhesive layer to the photo-electric conversion regions of the photoelectric conversion elements.

2. A full-contact type image sensor according to claim 1, wherein a refractive index of each of said micro-lenses is greater than that of said adhesive.

3. A full-contact type image sensor according to claim 1, wherein each of said micro-lenses is convex.

4. A full-contact type image sensor comprising:
   a light source for emitting light;
   a plurality of photoelectric conversion elements provided in a linear or two-dimensional array on a transparent insulating substrate and each having one or more apertures and a photoelectric conversion region, said light from said light source being allowed to pass solely through said apertures and blocked by the photoelectric conversion regions;
   a plurality of micro-lenses; and
   an optical fiber converging member including a bundle of a plurality of optical fibers in close contact via a transparent adhesive layer with the photoelectric conversion elements, said optical fiber converging member for guiding light having been transmitted through said apertures and said plurality of micro-lenses to illuminate an original document and for guiding light reflected from said original document through said adhesive layer to the photo-electric conversion regions of the photoelectric conversion elements,
   wherein said plurality of micro-lenses is provided at least at a photoelectric conversion element side end of said optical fiber converging member in one-to-one correspondence to said plurality of optical fibers.

5. A full-contact type image sensor according to claim 4, wherein a refractive index of each of said micro-lenses is less than that of said adhesive.

6. A full-contact type image sensor according to claim 4, wherein each of said micro-lenses is concave.

7. A full-contact type image sensor according to claim 4, further comprising a second plurality of micro-lenses provided at said original document side end of said optical fiber converging member in one-to-one correspondence to said plurality of optical fibers.

8. A full-contact type image sensor according to claim 7, further comprising a protective film covering said second plurality of micro-lenses.

9. A full-contact type image sensor according to claim 8, wherein a refractive index of each of said second plurality of micro-lenses is less than that of said protective film.

10. A full-contact type image sensor according to claim 8, wherein each of said second plurality of micro-lenses is concave.

11. A full-contact type image sensor comprising:

a light source for emitting light;

a plurality of photoelectric conversion elements provided in a linear or two-dimensional array on a transparent insulating substrate and each having one or more apertures and a photoelectric conversion region, said light from said light source being allowed to pass solely through said apertures and blocked by the photoelectric conversion regions;

a plurality of lens means provided in one-to-one correspondence with said photoelectric conversion elements; and an optical fiber converging member including a bundle of a plurality of optical fibers in close contact via a transparent adhesive layer with the photoelectric conversion elements, said optical fiber converging member for guiding light having been transmitted through said apertures and said plurality of lens means to illuminate an original document and for guiding light reflected from said original document through said adhesive layer to the photo-electric conversion regions of the photoelectric conversion elements, wherein each of said plurality of lens means is constituted by a first region and a second region of said optical fiber converging member arranged such that a numerical aperture of said plurality of optical fibers at said first region on a side of said photoelectric conversion elements is set to be greater than a numerical aperture of said plurality of optical fibers at said second region on a side of said original document.

12. A fully contact type image sensor according to claim 11, in which said optical fiber converging member is constituted by a plurality of optical fiber converging members which have different numerical apertures and which are stacked together axially with a plurality of optical fibers in each of them being respectively in one-to-one correspondence.

* * * * *